UNITED STATES PATENT OFFICE.

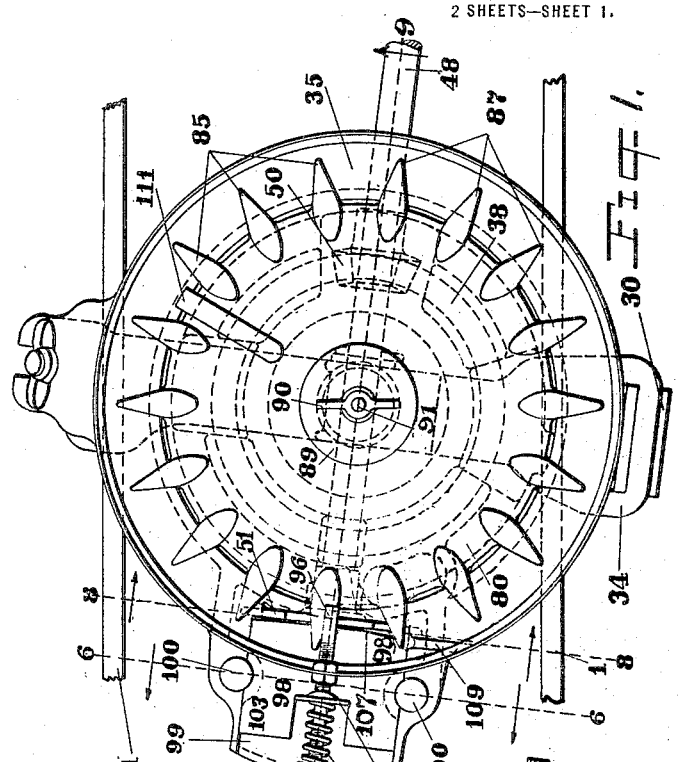

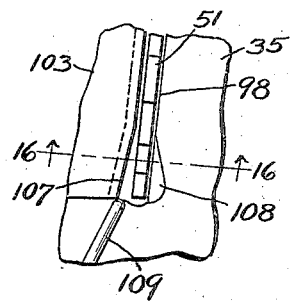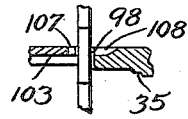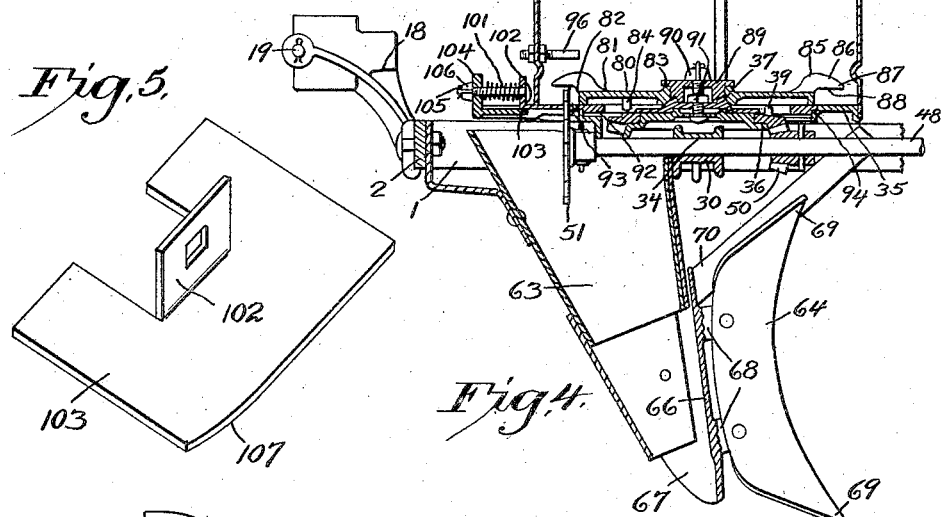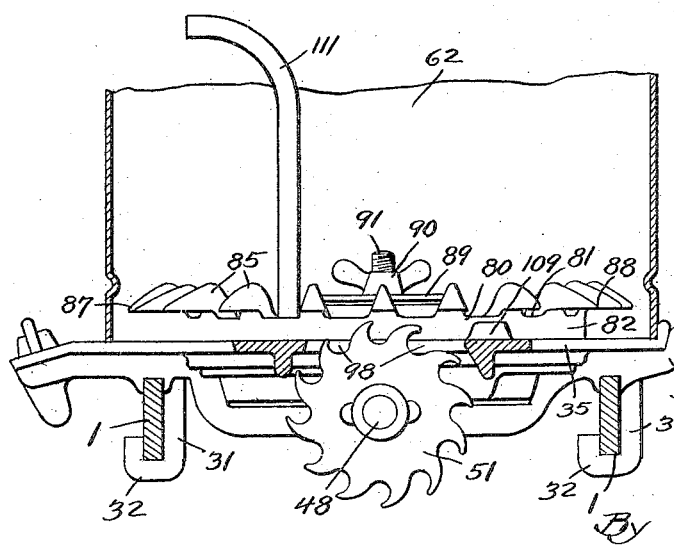

CHARLES E. WHITE AND GUST CARLSON, OF MOLINE, ILLINOIS, ASSIGNORS TO DEERE & COMPANY, OF MOLINE, ILLINOIS, A CORPORATION OF ILLINOIS.

PLANTING MECHANISM.

1,420,170.  Specification of Letters Patent.  Patented June 20, 1922.

Application filed March 22, 1918, Serial No. 224,058. Renewed December 3, 1921. Serial No. 519,800.

*To all whom it may concern:*

Be it known that CHARLES E. WHITE and GUST CARLSON, citizens of the United States, residing at Moline, in the county of Rock Island and State of Illinois, have invented certain new and useful Improvements in Planting Mechanisms, of which the following is a specification, reference being had therein to the accompanying drawing.

This invention relates to improvements in seed-planting implements, particularly improvements of the sort used for planting seed to which adhere, or which are covered by linty material, such as cottonseed. They are subjected to a ginning treatment for the purpose of removing, as far as possible, the lint filaments. But even after ginning, the seeds are still more or less covered by the lint, and they mat together when brought into contact, in masses, and cannot be readily segregated each from the others, by any of the ordinary appliances for handling seed in planting, as can other seeds, such as corn kernels, which have smooth, hard surfaces. Heretofore, in planting cottonseed they have been delivered to the ground in clusters of several, which adhere together, in each of which the number has been reduced as far as possible. Then after the plants begin to exhibit themselves above the surface of the earth they are subjected to the action of a "chopping" or thinning out process, so as to reduce the number of plants and space them.

But the cottonseed has become a valuable and important commodity in commerce and in several arts. And one of the purposes of the present invention is to effect a material economy in respect of the wastage of the cottonseed; that is to say, one of the objects is to provide devices by which the seeds in the matted clusters which approach the delivery point can be effectually segregated and each taken from the mass in the seed receptacle and dropped by itself at a predetermined point.

Fig. 1 is a top view of the receptacle, showing in plan view the parts at the bottom thereof for segregating the seed and delivering them one at a time.

Fig. 2 is a cross-section on line 6, 6 of Fig. 1.

Fig. 3 is a vertical section on the line 8, 8 of Fig. 1.

Fig. 4 is a vertical section on the line 9, 9 on Fig. 1.

Fig. 5 is a perspective of the yielding gate for regulating the cotton-seed passage.

Figs. 6 and 7 show modified forms of the wheel or disk which withdraws the cottonseed.

Fig. 8 is a plan view of a part of the base plate and showing in edge view part of the feed wheel; and also the slot or passage through the base plate for the latter.

Fig. 9 is a vertical section on line 14, 14 of Fig. 8.

Fig. 10 is a plan view of a modified form of the base plate.

Fig. 11 is a section on the line 16—16 of Fig. 10.

A seed carrying and delivering mechanism embodying our improvements can be combined with any suitable framework, and with any preferred form of mechanism for transmitting power to operative parts.

Generally we have combined the parts illustrated with a walking planter having a wheel in front adapted to transmit traction power for rotating the seed delivering devices.

The side bars of such a frame are indicated at 1, 1, and the crossbars at 2, 2. Upon the frame there is detachably secured crossbar 30 by hook holders 31, 32. At 48 is indicated a shaft for transmitting power from the ground wheel to the operative parts of the seeding mechanism.

The mechanism for carrying and delivering the seed has a base plate structure indicated by 35. At 36 it is shouldered to provide suitable support for a gear ring 38, which is held down by plate 37, the latter being fastened by a center pin 91. 39 are driving lugs extending up from the gear ring to drive the seed discharging devices, which have drive lugs 84. 50 is a pinion on shaft 48, engaging with the teeth on gear ring 38 to drive the seeder. The shaft 48 extends some distance to the rear of pinion 50 and carries a wheel, 51, whose purpose and structure will be described, it being of peculiar construction and arrangement.

In the base plate structure there is a vertical aperture 98 for the downward passage of the seed, one by one. This aperture, at the vertical lines where the seed goes down, has walls or edges peculiarly constructed and related. The inner edge 108 is shown as straight while the outer edge is inclined or tapered, to form a small pocket. Immediately adjacent to this edge 108 is placed a device for forcing the seed downward. For this purpose we utilized the wheel 51. We have found that this wheel, for delivering seed singly, must be much thinner than those heretofore used and yet made so as to be strong and not liable to rapid wear, and hence we form it of sheet metal, of a thickness dimension approximately equal to the thickness of each of the seeds to be delivered. It is formed with the peculiarly shaped hook teeth 97. It is positioned so as to have its inner face close to the inner plate edge or wall of the passage 98 in the base structure, and so as to have the hook shaped teeth 97, as they travel around the upper arc of their path, move close to the inner plate edge, the axis of the wheel 51 being considerably below the base plate. As the teeth approach the tapered passage 98, into which the seeds settle singly, they, successively, engage positively with the seeds, one by one, and force them downward through the aperture.

As some of the seeds may, because of varying amounts of lint adhering to them, respectively, require more space, laterally, for their downward escape, we arrange one of the plate edges or walls defining this aperture, so that it will automatically yield. As shown, this edge or wall is the one immediately outside of the picker wheel 51. It is the inner edge of a sliding gate 103, which is formed of sheet metal fitted in a rebate 99, in an extension of the base plate. It is held in place by headed guide pins 100. With it is combined a spring 101, which at one end bears against a lip 102 on the gate plate, and, at the other end, against a lug 104 on the base plate. If a seed thickened by adhering lint should reach the passage at 98, it will not be crushed or broken, as the plate 103 will yield sufficiently, while the hook or tooth 107 is dragging it down. As above described the inner edge of the plate 103 is not quite parallel to the wheel 51, but is inclined from its side edge to a point near its center, as shown at 107. The gate can be adjusted by a nut 106 and a screw 105, the headed end of which fits loosely against the lip 102 of the gate.

The following means are provided, for causing the seeds to move properly through the receptacle, and toward the discharging devices and for breaking up the clusters and delivering the seed singly to the picker wheel.

80 is a rotary plate, which rotates under the entire cylindrical mass of seeds. It comprises a flat horizontal part 81, with a downwardly extending flange 82 at its edge, a hollow boss or flange 83 near its center, drive lugs 84, and seed engaging teeth 85. Each of the latter extends upward and outward as at 86, having a point at 87 and a bottom line 88 in a plane somewhat above that of the plate part 81. The seed plate is fastened by cap 89 resting on the holding plate 37, and fastened by nut 90, engaging with the central pin or bolt 91. The flange 82 of the seed plate rests upon a ring 92, which is flanged at 93, the flanged part fitting in a rebate 94 in the base structure 35. The plate 80 is provided with an elongated upwardly extending agitating rod 111, for agitating the upper part of the seed mass and loosening the seeds, so as to induce them to constantly move downward.

At 96 there is a projection fastened to the wall of receptacle 62 and extending inward. It lies in planes just above those of rotating teeth 85 on the seed plate, and just above the picker wheel.

At 109 there is a lug or web on the base plate 35. It is inclined in the direction of rotation of plate 80 and extends to a point near the passage 98. It acts in conjunction with the teeth 85, in effecting final breaking up of the seed clusters and in separating each from its neighbors.

The passageway at 98 is, as remarked, but slightly wider than the thickness of the wheel 51, and this is, as stated, made of thin sheet metal of a thickness dimension such that it is not materially thicker than the diameter of the cottonseed. This is in contrast with the picker wheels or feed wheels in earlier cotton seeders, the teeth of which have been axially elongated and formed with extended surfaces designed to engage with and force downward 2, 3 or more seeds simultaneously. The teeth 97 are of such dimension, and are so shaped, that each one in turn takes one of the seeds, (as it is advanced by the rotary teeth 85, and guided by the web 109, and just as it reaches the passage 98,) and forces it down, singly, to the chute.

The seeds that escape downward are received in the chute 63, behind the furrow opener 64. These seed guiding and depositing devices may be of any preferred form, not forming part of our present invention. The opener is carried by holder 66 which projects at 67, some distance below chute 63. The holder is concavo-convex, and is carried by the suspending or brace arms 70, 71, from the main frame. It has ears 68 carrying opener 64. The latter being reversible and having similarly shaped parts 69 for its upper and lower ends.

In Fig. 6 we have shown at 51ª a modified form of the picker wheel with two seed-engaging teeth 97ª; and in Fig. 7 another modified form at 51ᵇ with a single seed tooth 97ᵇ. These operate similarly to the picker wheel with a larger number of teeth, such as shown in Fig. 3, except that they deliver the seeds at longer distance intervals each from the preceding one.

In Fig. 8 we have shown a partial plan of the base plate 35, together with a part of the picker wheel, to illustrate the passageway at 98 and the parts adjacent thereto. And Fig. 9 is a sectional view of the parts in Fig. 8 taken on the line 14—14.

Fig. 10 is a plan view and Fig. 11 is a section of the parts adjacent to the vertical passageway but showing a modification in that the upper part of the passageway is vertically flared as well as horizontally tapered. The base plate 35 is formed with a recess or cavity at 108, the metal along the upper part of the edge adjacent to the teeth of the picker wheel, being cut away to afford a slightly flaring mouth to assist in the down passage of the seed.

The operation of the devices above described will be readily understood. The shaft 48, wheel 51 and the pinion 50 are rotated by the power device. The pinion 50 causes the plate 80 to rotate. The hook teeth 85 stir up the seeds in the bottom stratum of the mass, tear them apart more or less and advance them toward the picker wheel 51. The seeds resting on the bottom plate 35 in the space below the lower edges 88 of the hook teeth 85 are caused to advance to the wheel 51 and enter the passage 98. The teeth 97 of the picker wheel engage with the seed successively as they enter the passageway, and complete the separation of them from their fellows, one by one, and force them downward. They are then deposited in the furrow, and the earth is placed upon them and packed by the covering wheel 14.

What we claim is:

1. In a mechanism for planting normally lint covered seeds initially in intermatted masses, the combination of the seed holder having, for the downward escape of the seed, a vertical passageway whose normal width approximates the thickness dimension of each of the seeds, one side wall of said passageway being horizontally yielding under pressure from the seed, means for separating the initially intermatted seeds from each other and delivering them to said passageway and means for forcing the seeds successively and singly through the passageway substantially as set forth.

2. In a mechanism for planting normally lint covered seeds initially in intermatted masses, the combination of the seed holder having, for the downward escape of the seed a vertical passageway whose normal width approximates the thickness dimensions of each of the seeds, and having a vertically flaring or tapered mouth, one side wall of said passageway being horizontally yielding under the pressure of the seeds, means for separating the initially intermatted seeds from each other and delivering them to said flaring mouth after segregating them, and means for forcing the seeds successively and singly downward through said passageway.

3. In a mechanism for planting normally lint covered seeds initially in intermatted masses, the combination of the seed holder having, for the downward escape of the seed a vertical passageway whose normal width approximates the thickness dimension of each of the seeds, and having a vertically and horizontally flaring or tapered mouth, one side wall of said passageway being horizontally yielding under the pressure of the seeds, means for separating the initially intermatted seeds from each other and delivering them to said flaring mouth after segregating them, and means for forcing the seeds successively and singly downward through said passageway.

4. In a mechanism for planting normally lint covered seeds initially in intermatted masses, the combination of the seed holder having, for the downward escape of the seed a vertical passageway whose normal width approximates the thickness dimension of each of the seeds, and having a vertically and horizontally flaring or tapered mouth, one side wall of said passageway being horizontally yielding under the pressure of the seeds, means for separating the initially intermatted seeds from each other and delivering them to said flaring mouth after segregating them, and a seed ejector movable through the said passageway of a thickness dimension substantially approximating the thickness dimension of each of the seeds.

5. In a planting mechanism of the class described, the combination of the seed receptacle, the base plate structure having for the downward passage of the seed a vertical passageway of a width dimension approximating the thickness dimension of each of the seeds and having at each of its sides a plate wall or plate edge, means moving in said passageway on lines fixed relatively to one of said edges for forcing the seed downward singly through the passageway, and the other of said plate edges being adapted to yield horizontally away from said means.

6. In a planting mechanism of the class described, the combination of the seed receptacle, the base plate structure having for the downward passage of the seeds a vertical passageway with a vertically flaring mouth, and having at each of its sides a plate wall or plate edge, and means moving in said passageway on lines fixed in relation to one of said plate edges for forcing the seeds downward, one at a time, the other of said plate edges being arranged to yield horizontally under pressure exerted by the seeds.

7. In a planting mechanism of the class described, the combination of the seed receptacle, the base structure having for the downward passage of the seeds an expansible passage way normally of a width dimension approximating the thickness dimension of relatively narrow seeds, means for positively engaging the seeds singly and forcing them successively downward through said passage way and means adapted to contact with the relatively wide seeds and to be moved laterally to expand said passage way.

8. In a planting mechanism of the class described, a seed receptacle, a base plate structure having for the downward passage of the seeds a vertical passageway, and a vertically disposed hook toothed wheel of a thickness dimension approximately equal to the thickness dimension of each of the seeds, and mounted on an axis below the passageway, and arranged to have its teeth successively travel vertically through said passageway.

9. In a planting mechanism of the class described, the combination of the seed holder, the base plate structure having, for the downward passage of seed, a vertical passageway, a sheet metal wheel with peripheral hook-shaped teeth, and mounted to have said teeth move first upward and then downward through said passageway, the plate edges or walls defining the passageway being tapered substantially as set forth for the lodgment of the seed therein.

10. In a planting mechanism of the class described, the combination of the seed holding devices, having for the downward escape of seed a vertical passageway whose normal width approximates the thickness dimension of each of the seeds, a relatively thin picker wheel with peripheral teeth concaved on their operative sides, and respectively adapted to more or less surround the seeds, successively, at the mouth of said passageway, and draw them down therethrough, said wheel being mounted to have said teeth move first upward and then downward through said passageway.

11. In a planting mechanism of the class described, the combination of the seed holding devices, having for the downward escape of seeds a vertical passageway whose normal width dimension approximates the thickness dimension of each of the seeds, and a relatively thin picker wheel rotating on an axis below the seed holder, and having peripheral hook-shaped teeth of a thickness dimension approximating that of the seeds, and arranged to move through the said passageway, and to engage with the seeds singly and successively and draw them downward therethrough.

12. In a planting mechanism of the class described, the combination of the seed holding device, having for the downward escape of the seeds a vertical passageway whose normal width dimension approximates the thickness dimension of each of the seeds, a relatively thin picker wheel with peripheral hook-shaped teeth movable into and out from the said passageway, and means for adjusting the width of the passage.

13. In a planting mechanism of the class described, the combination of the seed holding devices, having for the downward escape of the seeds a vertical passageway with an inner tapered edge wall and an outer tapered edge wall, the tapered edges forming a throat for the lodgment of seeds singly, and a relatively thin picker wheel having peripheral hook-shaped teeth of a thickness dimension approximately equal to the thickness dimension of each of the seeds, said teeth being arranged to move into and out from the said passageway and to positively engage with the seeds, successively, and force them downward.

14. In a planting mechanism of the class described, the combination of the seed holding devices, having for the downward escape of the seeds a vertical passageway with an inner tapered edge wall, and an outer tapered laterally yielding edge wall, and a relatively thin picker wheel having teeth arranged to travel into and out from said passageway, and to engage positively with the seeds singly and force them downward through said passageway.

15. In a planting mechanism of the class described, the combination of the seed holding devices, having for the downward escape of the seeds a vertical passageway normally of horizontal cross dimensions approximating the thickness dimension of each of the seeds, the relatively thin picker wheel having teeth of a thickness dimension substantially approximating the thickness of the seeds, said teeth being arranged to move into and out from the said pasageway, the means in the seed holder for carrying the seeds horizontally toward said passageway, and the seed guide 109 directed toward the picker wheel.

16. In a planting mechanism of the class described, the combination of the seed holding devices having the vertically arranged can-like receptacle, and having, for the downward passage of the seeds therefrom, a vertical passageway in vertical lines near those of the wall of the can, a rotary seed propelling device extending substantially across the receptacle and having a vertical flange or wall inside the wall of the receptacle and forming therewith an open annular channel wherein the seed can be propelled peripherally, and a vertically disposed toothed wheel projecting upward through and rotating in the aforesaid passageway and means for positively driving said wheel independently of the aforesaid seed propelling device, said vertical wheel being adapted to engage with the seeds successively and force them downward.

17. In a planting mechanism of the class described, the combination of the seed holding devices having a can-like receptacle with a vertical wall and a vertical passageway on vertical lines near those of said wall, the relatively elevated power driven seed propelling device extending substantially across the area of the receptacle and adapted to advance the seed peripherally, the vertically rotating picker wheel having peripheral hooked teeth, substantially as set forth, and mounted to have said teeth move upward and then downward through said passageway, and means for positively driving by power the said picker wheel independently of the said seed propelling devices.

18. In a planting mechanism of the class described, the combination of the seed holding devices having the vertically arranged can-like receptacle and having for the downward passage of the seeds a vertical passageway in vertical lines near those of the wall of the can, the vertically disposed picker wheel projecting upward through and rotating in the said passageway, a rotary seed propelling device extending substantially across the receptacle and having a vertical flange radially inside of the picker wheel whereby an open annular channel is provided, wherein the seed can be propelled toward the picker wheel and said rotary device having also radially extending fingers rotating in horizontal planes immediately above those of the picker wheel, and means in horizontal planes above the said fingers for stopping the rotation of the seed masses.

In testimony whereof, we affix our signatures.

CHARLES E. WHITE.
GUST CARLSON.